(12) United States Patent
Nyhuis et al.

(10) Patent No.: US 6,551,034 B1
(45) Date of Patent: Apr. 22, 2003

(54) DRILLING APPARATUS FOR TAPPING INTO A FLUID CONTAINING VESSEL

(76) Inventors: David Albert Nyhuis, RR #3, Fort Saskatchewan, Alberta (CA), T8L 2N9; Albert Hendrix Nyhuis, RR #3, Fort Saskatchewan, Alberta (CA), T8L 2N9

( * ) Notice: Subject to any disclaimer, the term of this patent is extended or adjusted under 35 U.S.C. 154(b) by 98 days.

(21) Appl. No.: 09/667,064

(22) Filed: Sep. 21, 2000

(30) Foreign Application Priority Data

Jul. 6, 2000 (CA) ............................................ 2313573

(51) Int. Cl.[7] .............................................. B23B 41/08
(52) U.S. Cl. ...................... 408/129; 408/138; 137/318
(58) Field of Search ......................... 408/99–101, 129, 408/137, 138; 137/15.12–15.14, 317, 318; 82/113

(56) References Cited

U.S. PATENT DOCUMENTS

| 2,115,992 | A | * | 5/1938 | Koppl .......................... 137/318 |
| 2,601,434 | A | | 6/1952 | DuBois |
| 2,972,915 | A | | 2/1961 | Milanovits et al. |
| 3,068,726 | A | | 12/1962 | Vernooy |
| 3,703,909 | A | | 11/1972 | Erb |
| 3,827,448 | A | * | 8/1974 | Alba ............................ 137/318 |
| 4,093,393 | A | * | 6/1978 | Smith et al. .................. 408/137 |
| 4,331,170 | A | | 5/1982 | Wendell |
| 4,332,272 | A | | 6/1982 | Wendell |
| 4,647,073 | A | | 3/1987 | Kosaka |
| 4,680,848 | A | | 7/1987 | Goldner |
| 4,832,069 | A | | 5/1989 | Gale et al. |
| 5,030,039 | A | | 7/1991 | Dove |
| 5,056,389 | A | * | 10/1991 | Johnstead ..................... 82/113 |
| 5,659,935 | A | | 8/1997 | Lo-Pinto et al. |
| 6,321,778 | B1 | * | 11/2001 | Chen et al. ................... 137/318 |

FOREIGN PATENT DOCUMENTS

| CA | 426813 | 4/1945 | | |
| CA | 531194 | 10/1956 | | |
| CA | 531586 | 10/1956 | | |
| CA | 645089 | 7/1962 | | |
| CA | 675771 | 12/1963 | | |
| CA | 675890 | 12/1963 | | |
| CA | 1178830 | 12/1984 | | |
| EP | 454431 A1 | * 10/1982 | ................. | 408/129 |
| JP | 63-2604 A | * 1/1988 | ................. | 408/137 |

* cited by examiner

Primary Examiner—Steven C. Bishop
(74) Attorney, Agent, or Firm—Terrence N. Kuharchuk; Rodman & Rodman

(57) ABSTRACT

A drilling apparatus for tapping into a fluid containing vessel from a valve device connected with the vessel. The apparatus is comprised of a housing having a lower end adapted for attachment of the apparatus to the valve device, the housing defining a housing bore, the housing bore defining a housing bore axis. A feed rod assembly is connected with the housing adjacent to the housing bore. In addition, a feed nut is connected with the feed rod assembly, the feed nut defining a first bore. A drilling rod extends through the housing bore and is rotatably supported in the first bore of the feed nut and a drilling bit is connected to a lower end of the drilling rod, for tapping into the vessel. Manipulation of the feed rod assembly results in axial movement of the feed nut and the drilling rod relative to the housing bore axis so that the drilling rod moves through the housing bore.

34 Claims, 6 Drawing Sheets

DRILLING APPARATUS FOR TAPPING INTO A FLUID CONTAINING VESSEL

FIELD OF INVENTION

The present invention relates to a drilling apparatus for tapping into a fluid containing vessel. The present invention further preferably relates to the drilling apparatus tapping into the vessel from a valve device connected with the vessel.

BACKGROUND OF INVENTION

Following the placement of a vessel, such as a pipe, on or beneath the ground surface, it may be necessary or desirable to make a connection with the vessel or to enter the vessel at a location where a hole or opening does not pre-exist. The operation of drilling or cutting a hole or opening in the vessel to facilitate the desired connection is often complicated by the presence of various fluids within the vessel, which fluids are typically under pressure and may be volatile or environmentally hazardous. Thus, in these circumstances, it is preferable to be able to make the desired connection without the necessity of interrupting the operation of the vessel and preferably in a manner inhibiting the leakage of any fluids from the vessel.

The cutting or drilling of an opening or hole into a vessel containing fluid, typically under pressure, is referred to as "hot tapping." Hot tapping permits the desired connection to be made without significantly interfering with the use or operation of the vessel. Thus, hot tapping is particularly applicable to industries such as the petroleum industry where a connection may be required or desired to be made to a pipeline, while minimizing any interference with the flow of fluid through the pipeline or disruption in service, as well as inhibiting the leakage of any fluids from the pipeline.

Various tapping machines and apparatuses have been developed for drilling or cutting a hole or opening into a fluid containing vessel. Typically, the hot tapping operation is accomplished by tapping into the vessel from a valve device connected with the vessel. More particularly, the valve device may be directly mounted or attached with the outer wall of the vessel or may be mounted or attached with a standpipe or branch pipe or connection extending from the outer vessel wall to the ground surface. In either case, the valve device in place is typically not in fluid connection with the vessel, in that an opening or hole does not pre-exist. The hot tapping operation establishes the desired fluid communication with the vessel by cutting or drilling the hole or opening in the outer vessel wall.

Where no valve device pre-exists, a valve device is typically welded, clamped or otherwise mounted or attached to the outer wall of the vessel prior to proceeding with the hot tapping operation. However, in these cases where the vessel is located underground, a considerable amount of time and expense may be incurred to access or excavate the vessel to place the valve device, subsequently perform the tapping operation and then backfill the excavation.

As a result, often times, in anticipation of the potential future need to establish a further connection with the vessel, the vessel is initially placed with a pre-existing valve device to permit easier access at a later date. Where the vessel is located underground, as discussed above, in anticipation of the need for a potential future connection, the vessel may include a standpipe or branch pipe or connection extending from the outer vessel wall to the ground surface. The valve device is then connected with the standpipe at or near the ground surface for relatively easy access without the need to excavate the site.

The hot tapping operation is simply performed by mounting the hot tapping apparatus to the valve device and running the drilling or cutting tool of the tapping apparatus through the open valve device and the standpipe or branch pipe to contact the vessel and cut or drill through the vessel wall. However, where the vessel is underground, the tapping apparatus must have sufficient dimensions to permit the drilling or cutting tool to extend through the length of the standpipe to the vessel wall beneath the surface. After the opening has been cut, the drilling or cutting tool is withdrawn and the valve device is closed to prevent the leakage of any fluids from the vessel. Any pressure within the tapping apparatus may then be bled off and the tapping apparatus may be removed from the valve device.

Thus, the tapping apparatus preferably performs two primary functions. First, the apparatus supports the drilling or cutting tool such that it may drill or cut the hole or opening in the vessel wall. Second, the apparatus preferably provides a feed mechanism for advancing or retracting the drilling or cutting tool towards or away from the vessel wall. In addition, the feed mechanism is preferably relatively easy to access and operate and the overall apparatus is of a relatively strong or sturdy construction.

Various devices or apparatuses have been developed for hot tapping fluid containing vessels. However, none of these devices have been found to be completely satisfactory.

For instance, Canadian Patent No. 426,813 issued Apr. 17, 1945 to Mercier, U.S. Pat. No. 4,331,170 issued May 25, 1982 to Wendell, U.S. Pat. No. 4,332,272 issued Jun. 1, 1982 to Wendell and U.S. Pat. No. 4,680,848 issued Jun. 21, 1987 to Goldner describe a tapping apparatus in which a drill bit is rotated through a drill stem, rod or shaft having a lower end attached with the drill bit. However, the drill bit is advanced towards the vessel wall by simply applying a direct longitudinal or axial force, typically manually, at an upper end of the drill stem, rod or shaft to move the drill bit relative to the vessel wall. In other words, no particular feed mechanism is provided for advancing or retracting the drill bit.

Other forms of tapping apparatus provide for a particular feed mechanism. However, the specific construction or configuration of the feed mechanism may result in a relatively unsturdy or weakened apparatus structure. Further, the specific construction or configuration often requires the operation of the feed mechanism from a location adjacent the upper end of the apparatus, which may be difficult to access depending upon the overall length or height of the tapping apparatus.

For instance, Canadian Patent No. 531,194 issued Oct. 2, 1956 to Mueller, Canadian Patent No. 645,089 issued Jul. 17, 1962 to Milanovits et. al., and U.S. Pat. No. 2,972,915 issued Feb. 28, 1961 to Milanovits et. al., Canadian Patent No. 675,771 issued Dec. 10, 1963 to Vemoov, Canadian Patent No. 675,890 issued Dec. 10, 1963 to Vernooy, U.S. Pat. No. 3,068,726 issued Dec. 18, 1962 to Vernoov and Canadian Patent No. 1,178,830 issued Dec. 4, 1984 to Yarnell provide for an inner drilling rod, referred to as a drill stem, drill rod or boring bar, attached with the drill bit, which is contained within an outer feed mechanism in a manner such that the inner drilling rod is coaxial with the outer feed mechanism. In other words, the longitudinal axis of the inner drilling rod coincides with the longitudinal axis of the outer feed mechanism. The outer feed mechanism is variously described as an outer feed sleeve, feed tube or feed or holder nut and is configured to permit the passage of the inner drilling rod therethrough. More particularly, rotation of the outer feed mechanism produces axial movement of the inner drilling rod in order to advance or retract the drill bit relative to the outer vessel wall.

The coaxial nature of the apparatus and the need to contain the inner drilling rod within the outer feed mechanism tends to result in a relatively complex structural arrangement of the apparatus and a relatively weakened structure of the apparatus overall. Further, as in Meuller, the Milanovits et. al. references and the Vernooy references, the complexity and weakening of the structure of the apparatus may be exacerbated by further containing both the drilling rod and the feed mechanism within a single housing or chamber, which is also coaxial with the drilling rod and the feed mechanism. Typically, the feed mechanism is threadably engaged with an inner surface of the housing such that rotation of the feed mechanism relative to the housing results in axial movement of the feed mechanism and drilling rod extending therethrough.

Conversely, Canadian Patent No. 531,586 issued Oct. 9, 1956 to Hill and U.S. Pat. No. 2,601,434 issued Jun. 24, 1952 to Du Bois provide for a substantially inner feed mechanism, referred to as a feed screw and which may be combined with a feed nut. The inner feed mechanism is contained within an outer drilling rod, referred to as a boring bar assembly or a quill, attached to the drill bit, such that the outer drilling rod is coaxial with the substantially inner feed mechanism. In other words, once again, the longitudinal axis of the outer drilling rod coincides with the longitudinal axis of the inner feed mechanism. Similarly, rotation of the inner feed mechanism produces axial movement of the outer drilling rod in order to advance or retract the drill bit relative to the outer vessel wall.

Once again, the coaxial nature of the apparatus and the need to contain the inner feed mechanism within the outer drilling rod tends to result in a relatively complex structural arrangement of the apparatus and a relatively weakened structure of the apparatus overall. Further, as in Hill and Du Bois the complexity and weakening of the structure of the apparatus may be exacerbated by further containing both the drilling rod and the feed mechanism within a single housing or chamber, which is also coaxial with the drilling rod and the feed mechanism.

Furthermore, each of these tapping apparatuses provides a "top drive" for the feed mechanism. In other words, the drive or power mechanism for the feed mechanism is located at an upper end of the tapping apparatus and particularly the upper end of the feed mechanism. This location tends to make access to and operation of the feed mechanism relatively difficult. In addition, Mueller, the Vemooy references, Yarnell and Hill all provide for the simultaneous rotation of the drilling rod and the advancement of the drilling rod towards the vessel wall by the feed mechanism.

Thus, there remains a need in the industry for an improved drilling apparatus for tapping into a fluid containing vessel, preferably from a valve device connected with the vessel. Preferably, the improved apparatus is relatively strong or sturdy and relatively less complex structurally as compared with known tapping machines and apparatuses. In addition, the improved apparatus is preferably comprised of a feed mechanism which is operable from a bottom or lower end of the feed mechanism for ease of access and operation.

SUMMARY OF THE INVENTION

The present invention relates to a drilling apparatus for tapping into a fluid containing vessel from a valve device connected with the vessel.

The apparatus includes a feed rod assembly which may be manipulated to move a drilling rod through a housing bore defined by a housing. The feed rod assembly is adjacent to the housing bore. In other words, the feed rod assembly is not coaxial with the drilling rod and is not contained within the housing bore.

In one aspect, the invention is a drilling apparatus for tapping into a fluid containing vessel from a valve device connected with the vessel, the apparatus comprising:

(a) a housing having a lower end adapted for attachment of the apparatus to the valve device, the housing defining a housing bore, the housing bore defining a housing bore axis;

(b) a feed rod assembly connected with the housing adjacent to the housing bore;

(c) a feed nut connected with the feed rod assembly, the feed nut defining a first bore;

(d) a drilling rod extending through the housing bore and rotatably supported in the first bore of the feed nut; and (e) a drilling bit connected to a lower end of the drilling rod, for tapping into the vessel;

wherein manipulation of the feed rod assembly results in axial movement of the feed nut and the drilling rod relative to the housing bore axis so that the drilling rod moves through the housing bore.

The feed rod assembly may be comprised of any structure or apparatus which can be manipulated to result in axial movement of the feed nut and the drilling rod relative to the housing bore axis so that the drilling rod moves through the housing bore.

For example, the feed rod assembly may be comprised of one or more telescoping members. The members may be actuated to move the drilling rod through the housing bore. The feed rod assembly may also be comprised of one or more jacks which can be raised or lowered to move the drilling rod through the housing bore. Preferably the feed rod assembly is comprised of at least one feed rod which has a threaded exterior surface which engages a complementary threaded surface on the feed nut such that rotation of the feed rod relative to the feed nut moves the drilling rod through the housing bore.

More particularly, the feed rod assembly is preferably comprised of a first feed rod, wherein the first feed rod is rotatably connected with the housing adjacent to the housing bore, wherein the first feed rod is comprised of a threaded exterior surface, wherein the feed nut defines a second bore, wherein the second bore is comprised of a threaded interior surface which engages the threaded exterior surface of the first feed rod, and wherein rotation of the first feed rod results in axial movement of the feed nut and the drilling rod relative to the housing bore axis.

In the preferred embodiment the feed rod assembly is further comprised of a second feed rod, wherein the second feed rod is rotatably connected with the housing adjacent to the housing bore, wherein the second feed rod is comprised of a threaded exterior surface wherein the feed nut defines a third bore, wherein the third bore is comprised of a threaded interior surface which engages the threaded exterior surface of the second feed rod, and wherein rotation of the first feed rod and the second feed rod results in axial movement of the feed nut and the drilling rod relative to the housing bore axis.

In the preferred embodiment, the apparatus is further comprised of a feed rod linkage for rotatably linking the first feed rod with the second feed rod so that the first feed rod and the second feed rod rotate together. Preferably the first feed rod and the second feed rod rotate at the same rate so that the second feed rod rotates one revolution for every one revolution of the first feed rod. Preferably the amount of axial movement of the feed nut relative to the first feed rod (per revolution) is the same as the amount of axial movement of the feed nut relative to the second feed rod (per revolution). These results are achieved in the preferred embodiment by matching the pitch of the threads on the first feed rod and the second feed rod and by ensuring that the feed rod linkage provides a 1:1 linkage.

The feed rod linkage may be comprised of any structure or apparatus which can link the rotation of the first feed rod and the second feed rod such that the rate of rotation of the second feed rod relative to the rate of rotation of the second feed rod may be controlled. For example, the feed rod linkage may be comprised of a combination of belts and pulleys or intermeshing gears.

In the preferred embodiment the feed rod linkage is comprised of a first feed rod sprocket connected with the first feed rod, a second feed rod sprocket connected with the second feed rod, and a drive chain engaged with both the first feed rod sprocket and the second feed rod sprocket. A chain and sprocket assembly is preferred over a belt an pulley assembly because of the more positive control that may be maintained over the relative rotations of the first feed rod and the second feed rod by using a chain and sprocket assembly.

Preferably the drilling rod has a drilling rod axis, the first feed rod has a first feed rod axis, and the second feed rod has a second feed rod axis. In the preferred embodiment the drilling rod axis, the first feed rod axis and the second feed rod axis are all substantially parallel to each other.

Furthermore, in the preferred embodiment the drilling rod axis is substantially parallel to the housing bore axis. Ideally the drilling rod and the housing bore are coaxial. In this manner, axial movement of the feed nut relative to the first feed rod axis and the second feed rod axis results in a corresponding and equal movement of the feed nut and the drilling rod relative to the housing bore axis.

The first feed rod and the second feed rod are preferably configured relative to the drilling rod so that the drilling rod is between the first feed rod and the second feed rod. This configuration results in an amount of symmetry between the drilling rod and the feed rod assembly.

For example, a first circular plane perpendicular to the drilling rod axis may have a diameter which is defined by the intersection of the plane by the first feed rod axis and the second feed rod axis. Preferably, the drilling rod axis will intersect the first circular plane.

The apparatus may be further comprised of a support frame associated with the housing. The primary purpose of the support frame is to help to maintain alignment of the feed rod assembly relative to the drilling rod. The support frame may also serve to reinforce the apparatus, thus increasing its strength and rigidity.

The support frame may be comprised of any structure which is capable of providing some reinforcement for the apparatus. For example, the support frame may be comprised of any number of frame members. These frame members preferably help to rigidify the connection between the feed rod assembly and the housing.

In the preferred embodiment the support frame is comprised of a first frame member connected with the housing and a second frame member connected with the housing.

Preferably the first frame member has a first frame member axis and the second frame member has a second frame member axis. In the preferred embodiment the drilling rod axis, the first frame member axis and the second frame member axis are all substantially parallel to each other.

The first frame member and the second frame member are preferably configured relative to the drilling rod so that the drilling rod is between the first frame member and the second frame member. This configuration results in an amount of symmetry between the drilling rod and the support frame.

For example, a second circular plane perpendicular to the drilling rod axis may have a diameter which is defined by the intersection of the plane by the first frame member axis and the second frame member axis. Preferably, the drilling rod axis will intersect the second circular plane.

Preferably the apparatus is capable of being used for "hot tapping" operations in which the vessel contains pressurized fluid. The apparatus may be used for tapping or hot tapping into any type of vessel. In the preferred embodiment the apparatus is intended for use for hot tapping into pipelines.

As a result, in the preferred embodiment the apparatus is further comprised of a sealing device contained within the housing bore for sealing between the housing bore and the drilling rod. Preferably the sealing device is capable of withstanding high pressure. More preferably the sealing device is also capable of withstanding high temperatures. Preferably the apparatus also includes a sealing mechanism or sealing assembly associated with the housing for sealing between the lower end of the housing and the valve device.

The feed rod assembly may be actuated in any manner which is compatible with the design of the feed rod assembly. For example, the feed rod assembly may be actuated hydraulically, pneumatically, electrically or mechanically and may be actuated manually or automatically.

Depending upon the design of the feed rod assembly, the feed nut may move with the feed rod assembly or relative to the feed rod assembly and the feed rod assembly may be actuated by rotational movement or linear or longitudinal movement. For example, if the feed rod assembly is comprised of telescoping members the feed nut may be fixedly connected with a telescoping member and may move as a result of linear movement of the feed rod assembly. In the preferred embodiment the feed rods rotate relative to the feed nut so that the feed rod assembly is actuated by rotating the feed rods.

In the preferred embodiment the feed rod assembly may be actuated by any mechanism which can rotate both the first feed rod and the second feed rod via the feed rod linkage. For example, the apparatus may be permanently equipped with a rotary drive mechanism such as a motor for rotating one or both of the first feed rod and the second feed rod. Alternatively the apparatus may be adapted such that a rotary drive mechanism such as a drill can be connected with the feed rod assembly to rotate the feed rods.

In either case, the apparatus preferably further comprises a drive attachment associated with one of the first feed rod and the second feed rod for connection with a drive mechanism in order to rotate the feed rods. This drive attachment may be comprised of any structure which provides compatibility between the feed rod assembly and the selected drive mechanism.

Preferably the feed rod assembly may be actuated by an operator from a standing position on the ground adjacent to the apparatus, thus avoiding the use of scaffolding or ladders.

Preferably this result is achieved by locating the drive attachment as close to the lower end of the housing as possible. In the preferred embodiment, the first feed rod has a lower end, the second feed rod has a lower end, and the drive attachment is associated with either the lower end of the first feed rod or the lower end of the second feed rod.

In the preferred embodiment the housing has an upper end and the feed rods and the frame members have upper ends which extend above the upper end of the housing. As a result, in the preferred embodiment the apparatus is further comprised of a top mount for the feed rod assembly and for the support frame so that the feed rods and the frame members extend between the upper end of the housing and the top mount. The feed rods and the frame members are connected with the top mount. The feed rods are rotatably connected with the top mount and the frame members are preferably fixedly connected with the top mount to enhance the rigidity of the apparatus between the housing and the top mount.

As indicated, one of the purposes of the support frame is to maintain alignment of the feed rod assembly. As a result, in the preferred embodiment the feed nut is comprised of a first frame engaging surface which is slidably engaged with the first frame member and a second frame engaging surface which is slidably engaged with the second frame member, so that the feed nut can be guided and supported by the support frame as it moves axially relative to the feed rods.

The apparatus and the feed rod assembly may be designed to provide for any range of relative axial movement of the feed nut and the drilling rod. In the preferred embodiment where the feed rods extend between the upper end of the housing and the top mount, the feed nut has a range of axial movement contained between the upper end of the housing and the top mount.

BRIEF DESCRIPTION OF DRAWINGS

Embodiments of the invention will now be described with reference to the accompanying drawings, in which.

DETAILED DESCRIPTION

Figure 1:
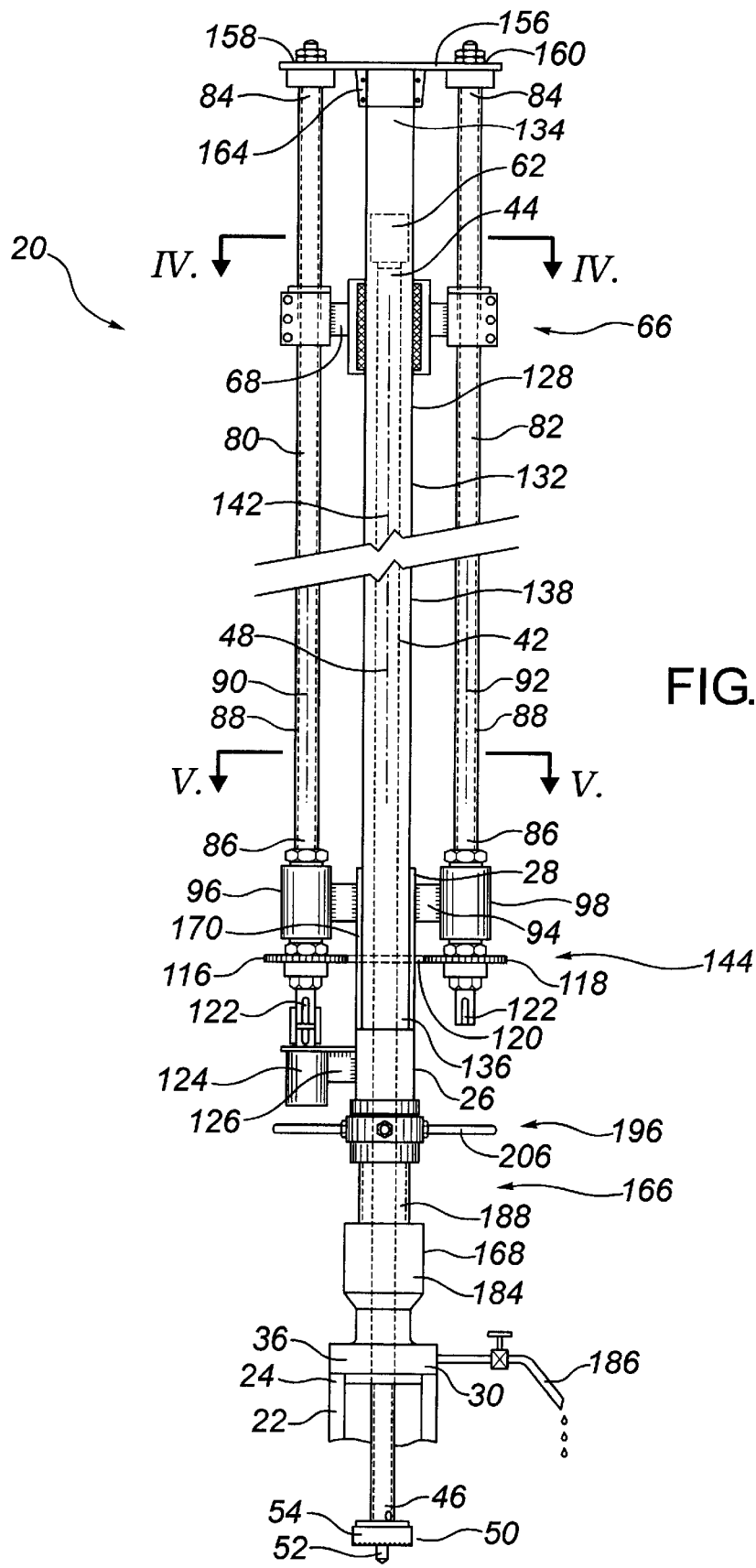
FIG. 1 is a front view of a preferred embodiment of a drilling apparatus for tapping into a fluid containing vessel.

Referring to FIGS. 1–7, a drilling apparatus (20) is provided for tapping into a fluid containing vessel from a valve device (22) connected with the vessel. Preferably, the drilling apparatus (20) is adapted, as described below, for hot tapping the vessel or tapping into a vessel containing fluid under pressure, while minimizing the loss of fluid from the vessel during such tapping operation. The vessel may be any container or housing such as a pipe or pipeline capable of containing a fluid, preferably a fluid under pressure.

The valve device (22) may be any type of valve or valving structure capable of being actuated between an open position to permit the drilling of the vessel and the passage of fluid therethrough and a closed position to prevent or inhibit the passage of fluid therethrough such that the fluid is contained within the vessel. More particularly, the valve device (22) is of a type defining a relatively straight bore therethrough between an upper end (24) for attachment with the drilling apparatus (20) and a lower end associated directly or indirectly with the wall of the vessel to be tapped. For instance, the valve device (22) is preferably a gate type valve.

Thus, in use, the drilling apparatus (20) is preferably sealingly mounted or attached with the upper end (24) of the valve device (22) and the valve device (22) is opened. As a result, the vessel wall may be accessed and drilled through the bore of the valve device (22) by the drilling apparatus (20) as described further below. Once the drilling and tapping operation are completed, the valve device (22) may be closed to permit the removal of the drilling apparatus (20), while minimizing or preventing the loss of fluid from the vessel.

Preferably, the vessel is comprised of a pre-existing valve device (22) connected with the vessel at the location in the vessel at which it is desired to establish a further fluid connection with the vessel. However, where no valve device (22) pre-exists at the desired location, a valve device (22) may be connected, attached or affixed with the vessel in any manner, such as by welding or clamping the valve device (22) with the vessel wall prior to attachment of the drilling apparatus (20) in order to proceed with the tapping operation.

In either case, the valve device (22) may be directly or indirectly connected with the vessel. For instance, the valve device (22) may be directly mounted or attached with the outer wall of the vessel. Alternately, the valve device (22) may be mounted or attached with a standpipe or branch pipe or connection extending from the outer vessel wall to the ground surface such that the valve device (22) may be more readily accessed for attachment of the drilling apparatus (20). In either case, the valve device (22) in place is not in fluid connection with the vessel until such time that the tapping operation is completed by the drilling apparatus (20). The tapping operation establishes the fluid communication with the vessel at the desired location.

Figure 6:
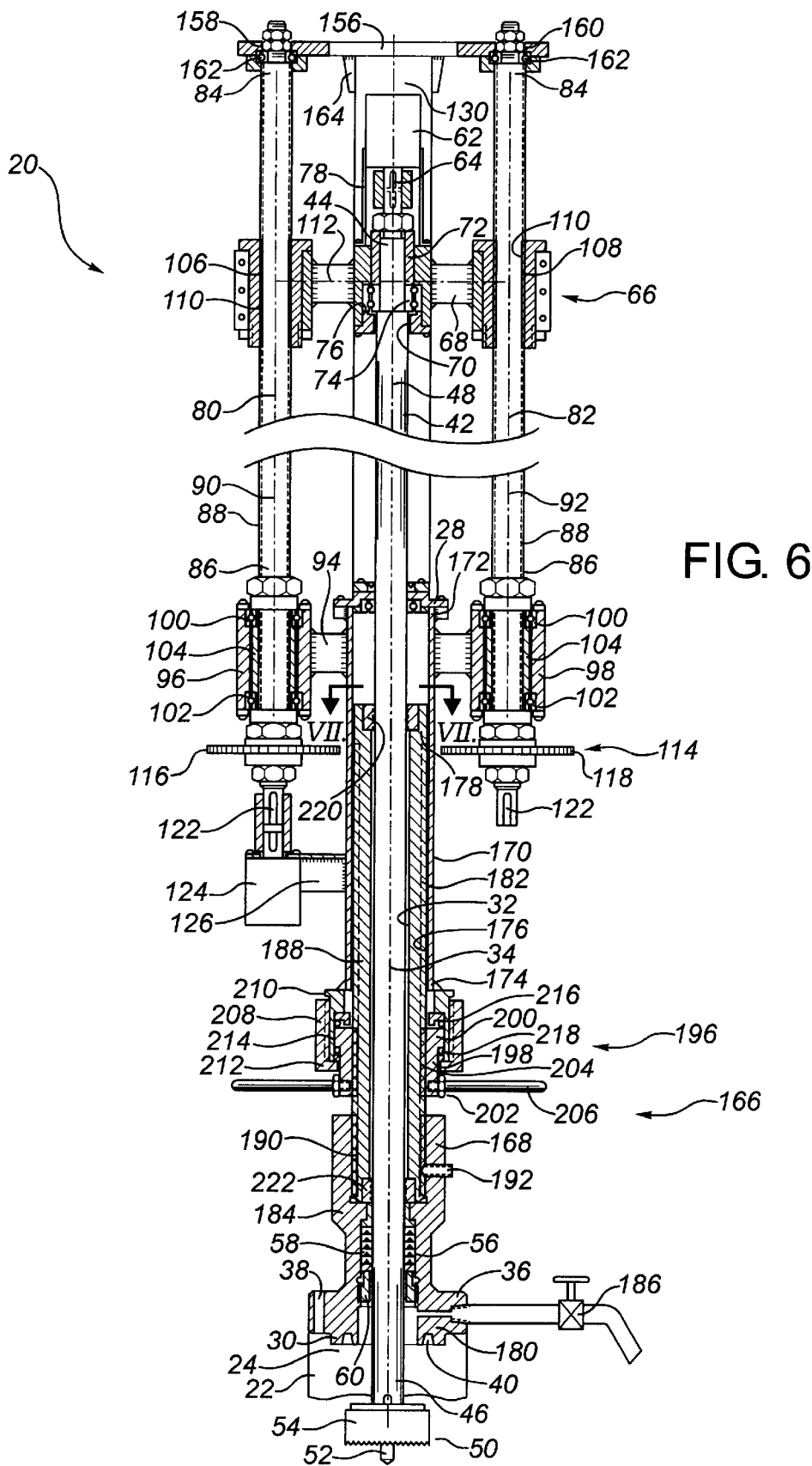
FIG. 6 is a longitudinal sectional view of the drilling apparatus taken along lines 6—6 of FIG. 3.

The drilling apparatus (20) of the within invention is comprised of a housing (26) having an upper end (28) and an opposed lower end (30) which is adapted for attachment of the apparatus (20) to the upper end (24) of the valve device (22). Thus, the upper end (24) of the valve device (22) and the lower end (30) of the housing (26) are each configured to be compatible with the other in order to permit the attachment between the housing (26) and the valve device (22). In addition, the housing (26) defines a housing bore (32) extending between the upper and lower ends (28, 30) of the housing (26). The housing bore (32) further defines a housing bore axis (34), as shown in FIG. 6, being a longitudinal axis extending through the housing bore (32) between the upper and lower ends (28, 30) of the housing (26).

The housing (26) may be comprised of a single unitary element or member or it may be comprised of two or more elements or members attached, mounted or otherwise affixed together to provide the housing (26). In the preferred embodiment, as described in detail below, the housing (26) is comprised of a plurality of elements or members which are interconnected such that the elements or members of the housing (26) are permitted to telescope relative to each other either away from or towards each other to increase or decrease the length of the housing (26) respectively.

In any event, as stated, the lower end (30) of the housing (26) is adapted for attachment to the valve device (22), preferably the upper end (24). The lower end (30) of the housing (26) may be attached with the valve device (22) in any manner or by any structure, mechanism or device permitting the attachment, connection, mounting or affixation of the adjacent upper and lower ends (24, 30) of the valve device (22) and the housing 926) respectively. Further, the lower end (30) of the housing (26) is adapted for attachment in a manner permitting the ends (24, 30) to be detached following the completion of the tapping operation.

In the preferred embodiment, the lower end (30) of the housing (26) is comprised of a flange (36) for detachably mounting the housing (26), and thus the apparatus (20), to the valve device (22). The flange (36) is shaped or configured to be compatible with the upper end (24) of the valve device (22). Further, the mounting flange (36) at the lower end (30) may be removably connected with the valve device (22) by any releasable fastener or fastening structure, mechanism or device. Preferably, the flange (36) defines two or more apertures (38) therethrough for receipt of a fastener, such as a screw or bolt, therein. In the preferred embodiment, the fastener extends through the flange (36) of the housing (26) for receipt in compatible apertures defined by the upper end (24) of the valve device (22). Thus, tightening of the fastener within the aperture secures or connects the housing (26) of the apparatus (20) to the valve device (22), while removal of the fastener permits the removal of the apparatus (20).

Further, a fluid-tight seal is preferably provided between the adjacent ends (24, 30) of the valve device (22) and the housing (26) when connected together in order to inhibit the passage or flow of fluid from the valve device (22). As a result, a sealing assembly is preferably associated with the lower end (30) of the housing (26), being defined by the lowermost end or surface of the flange (36). The sealing assembly may be comprised of any type or number of seals, sealing structures or sealing elements capable of sealing the adjacent ends (24, 30) during the tapping operation. Preferably, the lower end (30) of the flange (36) defines a groove (40) therein extending about the entire circumference of the housing bore (32). Further, at least one O-ring (not shown) is preferably contained within the groove (40) for sealing with the upper end (24) of the valve device (20).

The apparatus (20) is further comprised of a drilling rod (42) extending through the housing bore (32) and rotatable therein. More particularly, the drilling rod (42) has an upper end (44) extending from the upper end (28) of the housing (26) and a lower end (46) extending from the lower end (30) of the housing (26). The drilling rod (42) may be comprised of a single elongate piece or member or it may be comprised of two or more elongate pieces or members connected together to provide a unitary drilling rod (42). In either case, the drilling rod (42) has a drilling rod axis (48). The drilling rod axis (48) extends through the housing bore (32) and is preferably coaxial or concurrent with the housing bore axis (34) as shown in FIG. 6.

Further, a drilling bit (50) is connected to or with the lower end (46) of the drilling rod (42). During the tapping operation, the drilling bit (50) connected with the lower end (46) of the drilling rod (42) extends from the lower end (30) of the housing (26) and passes through the bore of the valve device (22) for engagement with the wall of the vessel. The drilling bit (50) may be comprised of any tool, device or mechanism capable of and suitable for drilling or cutting an opening in the vessel wall.

In the preferred embodiment, rotation of the drilling rod (42) rotates the drilling bit (50) such that the drilling bit (50) drills through the vessel wall. Preferably, the drilling bit (50) is of a type permitting the cutting and removal of a coupon or disc from the vessel wall. Specifically, the drilling bit (50) preferably includes a pilot bit (52) and a cutter (54), wherein the pilot bit (52) is comprised of a spring actuated detent for retaining the coupon or disc for removal as the coupon is cut or milled by the cutter (54) from the vessel wall. Further, longitudinal or axial movement of the drilling rod (42) within the housing bore (32) causes the drilling bit (50) to be moved into engagement with the vessel wall or to be retracted from the vessel wall.

As well, at least one sealing device (56) is contained within the housing bore (32) for sealing between the housing bore (32) and the drilling rod (50). The sealing device (56) may be located at any position or location along the length of the drilling rod (42) within the housing bore (32). However, preferably, at least one sealing device (56) is located at, adjacent or in proximity to the lower end (30) of the housing (26) to inhibit the leakage of any fluid into the housing (26). The sealing device (56) may be comprised of any seal, sealing structure or sealing element capable of, and suitable for, sealing between the drilling rod (42) and the housing bore (32) during the rotation and axial or longitudinal movement of the drilling rod (42) within the housing bore (32). In the preferred embodiment, the sealing device (56) is comprised of a plurality of high pressure packing elements and chevron bushings (58) held in place, at least in part, by a packing gland nut (60). Specifically, the sealing device (56) is selected to be suitable for the particular hot tapping operation to be performed and to be capable of withstanding the fluid pressure and fluid temperature within the vessel. In the preferred embodiment, the sealing device (56) is selected to be suitable for use at pressures of up to 1440 psi at 100° C. and 700 psi at 700° C.

In addition, the drilling rod (42) may be rotated by any hydraulic, pneumatic, electric or mechanical drive mechanism, drive attachment or motor capable of rotating the drilling rod (42) to manually or automatically actuate or operate the drilling bit (50). However, preferably, the drive mechanism is comprised of a motor (62) which is preferably powered hydraulically.

The motor (62) may be associated with or drivingly engage the drilling rod (42) in any manner permitting the motor (62) to rotate the drilling rod (42). Further, the motor (62) may be associated with or drivingly engage the drilling rod (42) at any suitable position or location along the length of the drilling rod (42). However, preferably, the motor (62) drivingly engages the drilling rod (42) at, adjacent or in proximity to the upper end (44) of the drilling rod (42). In the preferred embodiment, the motor (62) is positioned above and drivingly engages the upper end (44) of the drilling rod (42). The particular mounting of the motor (62) is discussed further below. Further, the motor (62) is preferably comprised of a rotatable drive shaft (64) which extends from the motor (62) to engage the upper end (44) of the drilling rod (42). Thus, rotation of the drive shaft (64) by the motor (62) results in a corresponding rotation of the drilling rod (42).

In addition, the drilling apparatus (20) of the within invention is further comprised of a feed rod assembly (66) connected with the housing (26) adjacent to the housing bore (32), and more preferably, adjacent to the housing (26). In other words, the feed rod assembly (66) is preferably not contained within the housing bore (32) or the housing (32). Further, the apparatus (20) is comprised of a feed nut (68) connected with the feed rod assembly (66). The feed nut (68) defines a first bore (70) therein and is positioned relative to the housing (26) for receipt of the drilling rod (42) within the first bore (70). More particularly, the feed nut (68) is positioned above the housing (26), or nearer to the upper end (28) of the housing (26), so that the upper end (44) of the drilling rod (42) may extend from the upper end (28) of the housing (26) for receipt within or engagement with the first bore (70) of the feed nut (68).

The drilling rod (42) is rotatably supported in the first bore (70) of the feed nut (68). As a result, the feed rod assembly (66) and the feed nut (68) provide the feed mechanism for the drilling rod (42) in order to move the drilling bit (50) into and out of engagement with the vessel wall. More particularly, manipulation of the feed rod assembly (66) results in axial or longitudinal movement of the feed nut (68) and the drilling rod (42) relative to the housing bore axis (34) so that the drilling rod (42) moves through the housing bore (32). The feed rod assembly (66) may be manipulated in any manner and by any mechanism capable of moving the feed nut (68) axially.

Figure 3:
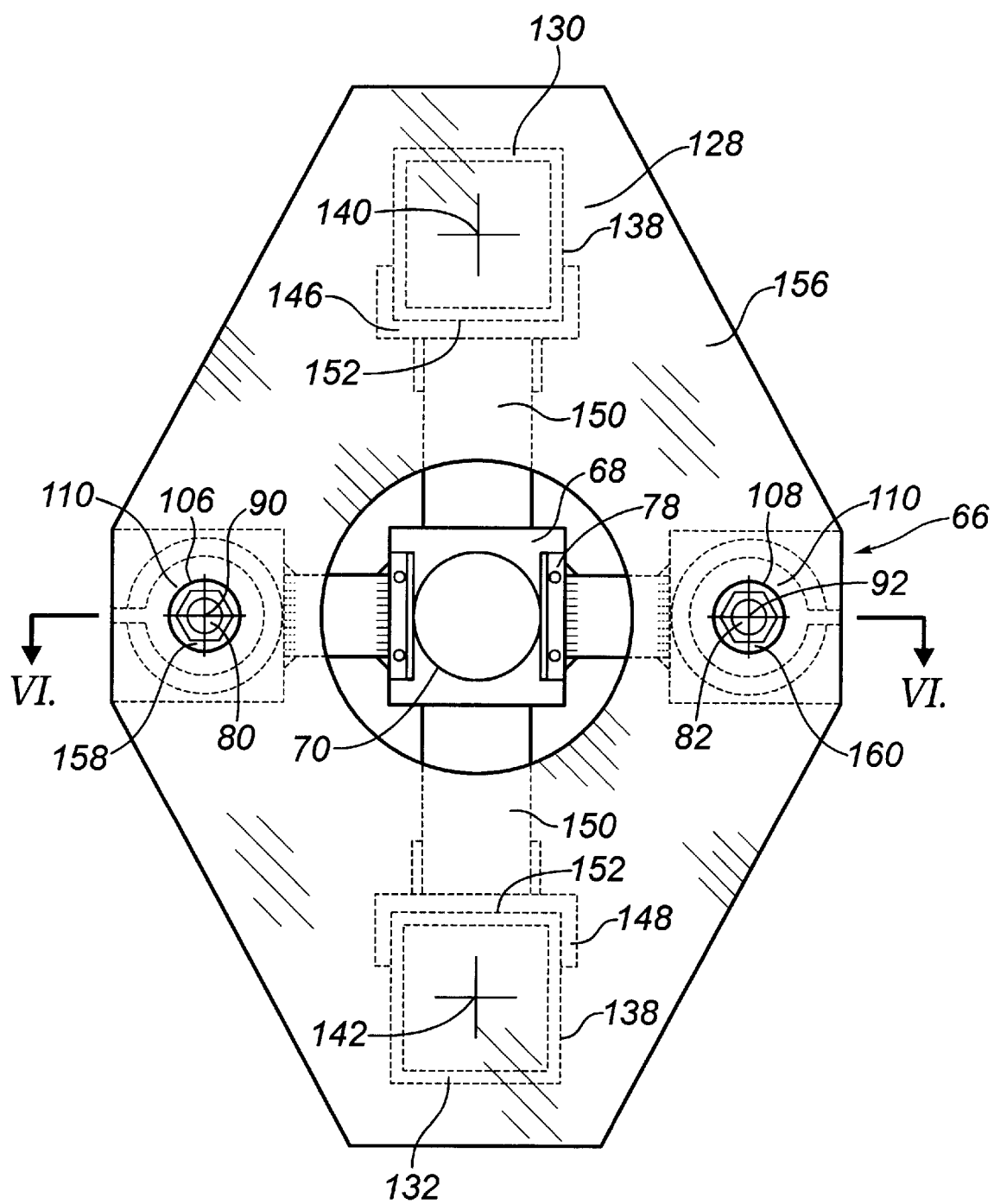
FIG. 3 is a top view of the drilling apparatus as shown in FIG. 1.

The feed nut (68) may have any shape or configuration permitting the functioning of the feed nut (68) as described herein. In addition, the first bore (70) may be located at any position within the feed nut (68) permitting the drilling rod (42) to be received and rotatably supported therein. However, as shown in FIG. 3, the first bore (70) is preferably centrally located within the feed nut (68). Further, the drilling rod (42) may be rotatably supported in the first bore (70) of the feed nut (68) in any manner and by any mechanism or structure permitting the rotation of the drilling rod (42) therein about its axis (48) while supporting the drilling rod (42) axially or longitudinally.

In the preferred embodiment, the drilling rod (42) includes an enlarged portion or sleeve (72) integral with, or mounted, affixed or fastened to, the upper end (44) of the drilling rod (42). The sleeve (72) provides a downwardly facing shoulder which is positioned within the first bore (70) and supported by at least one bearing or bearing assembly (74). In the preferred embodiment, the bearing (74) is a ball bearing to permit the rotation of the drilling rod (42) while longitudinally supporting the drilling rod (42). Further, the feed nut (68) defines an upwardly facing shoulder (76) for supporting the ball bearing (74) within the feed nut (68). Thus, the bearing (74) is positioned within the feed nut (68) between the sleeve (72) of the drilling rod (42) and the upwardly facing shoulder (76) of the feed nut (68). Accordingly, the drilling rod (42) is permitted to rotate within the first bore (70) of the feed nut (68).

The motor (62) is preferably positioned above the upper end (44) of the drilling rod (42) such that the drive shaft (64) extends from the motor (62) for engagement with the sleeve (74) at the upper end (44) of the drilling rod (42). As a result, the motor (62) is preferably permanently or removably attached, mounted or fastened with the feed nut (68) such that the motor (62) is held in the desired position relative to the drilling rod (42). In the preferred embodiment, as shown in FIGS. 3 and 6, the motor (42) is removably mounted with an uppermost surface of the feed nut (68) by a mounting bracket (78) held or fastened into position by one or more fasteners, such as bolts or screws.

The feed rod assembly (66) is preferably comprised of at least one feed rod rotatably connected with the housing (26) adjacent the housing bore (32) and associated with the feed nut (68) such that rotation of the feed rod results in axial movement of the feed nut (68) and the drilling rod (42) relative to the housing bore axis (34). In this case, the feed rod has a feed rod axis which is preferably substantially parallel to the drilling rod axis (48).

In the preferred embodiment, the feed rod assembly (66) is comprised of two feed rods, a first feed rod (80) and a second feed rod (82) as shown in FIGS. 1 and 6. Both the first feed rod (80) and the second feed rod (82) are rotatably connected with the housing (26) adjacent to the housing bore (32). Further, each feed rod (80, 82) has an upper end (84), a lower end (86) and an exterior surface (88). As well, the first feed rod (80) has a first feed rod axis (90) and the second feed rod (82) has a second feed rod axis (92).

The first and second feed rods (80, 82) may be rotatably connected with the housing (26) at any position or location along the length of the housing (26). Preferably, the first and second feed rods (80, 82) are rotatably connected with the housing (26) at, adjacent or in proximity to the upper end (28) of the housing (26). Further, the feed rods (80, 82) may be connected with the housing (26) at any position or location along the length of the feed rods (80, 82). Preferably, the first and second feed rods (80, 82) are rotatably connected with the housing (26) at, adjacent or in proximity to their respective lower ends (86). Thus, in the preferred embodiment, the lower end (86) of each feed rod (80, 82) is rotatably connected with the upper end (28) of the housing (26) such that each feed rod (80, 82) extends from its lower end (86) away from the upper end (28) of the housing (26) to its upper end (84).

Each feed rod (80, 82) is preferably an elongate member or structure and may be comprised of any material permitting the functioning of the feed rod assembly (66) as described herein. Further, the feed rods (80, 82) may be hollow or tubular and may have any shape or configuration on cross-section. However, in the preferred embodiment, as shown on FIGS. 4, 5 and 7, the feed rods (80, 82) are preferably elongate solid rods which are circular on cross-section.

The first feed rod (80) and the second feed rod (82) may be connected with the housing (26) adjacent to the housing bore (32) in any manner and by any permanent or detachable mounting structure permitting the rotation of the feed rod (80, 82) therein. Preferably, the apparatus (20) is comprised of a bottom mount (94) connected, mounted or affixed with the housing (26), preferably in a permanent manner such as by welding. The bottom mount (94) is comprised of a first sleeve (96) and a second sleeve (98) for receiving the lower end (86) of the first and second feed rods (80, 82) respectively therein. Each of the first and second sleeves (96, 98) is adapted to permit the rotation of the feed rods (80, 82) therein. More particularly, each of the first and second sleeves (96, 98) rotatably supports the respective lower ends (86) of the feed rods (80, 82) therein.

The feed rods (80, 82) may be rotatably supported within or by the sleeves (96, 98) in any manner and by any mechanism or structure permitting the rotation of the feed rods (80, 82) therein about their respective axes (90, 92), while inhibiting or preventing the longitudinal or axial movement of the feed rods (80, 82) relative to their respective sleeves (96, 98). Preferably, each sleeve (96, 98) is comprised of at least one upper bearing (100) or bearing assembly and at least one lower bearing (102) or bearing assembly for rotatably supporting the lower end (86) of each feed rod (80, 82) therebetween. In the preferred embodiment, each upper and lower bearing (100, 102) is comprised of a ball bearing. In addition, each sleeve (96, 98) may be further comprised of at least one spacer (104) for positioning about the lower end (86) of the feed rod (80, 82) to assist in the centralization of the feed rod (80, 82) within the sleeve (96, 98).

In addition, the feed nut (68) preferably defines at least one further bore for operatively engaging each feed rod.

Thus, in the preferred embodiment, the feed nut (68) defines a second bore (106) for operatively engaging the first feed rod (80) and a third bore (108) for operatively engaging the second feed rod (82). The second and third bores (106, 108) may operatively engage the first and second feed rods (80, 82) respectively in any manner and by any mechanism or structure permitting the rotation of the feed rod (80, 82) in order to move the feed nut (68) axially. In the preferred embodiment, each of the first feed rod (80) and the second feed rod (82) is comprised of a threaded exterior surface (88). Preferably, the exterior surface (88) is threaded substantially between the upper end (84) of the feed rod (80, 82) and the bottom mount (94). In addition, each of the second bore (106) and the third bore (108) has a threaded interior surface (110) compatible with the threaded exterior surfaces (88) of the feed rods (80, 82).

The threaded interior surface (110) of the second bore (106) engages the threaded exterior surface (88) of the first feed rod (80). As a result, rotation of the first feed rod (80) results in axial movement of the feed nut (68) and the drilling rod (42) supported thereby relative to the housing bore axis (34) so that the drilling rod (42) moves through the housing bore (32). Similarly, the threaded interior surface (110) of the third bore (108) engages the threaded exterior surface (88) of the second feed rod (82). As a result, rotation of the second feed rod (82) also results in axial movement of the feed nut (68) and the drilling rod (42) supported thereby relative to the housing bore axis (34) so that the drilling rod (42) moves through the housing bore (32). Rotation of the feed rods (80) in a first direction will lower the drilling rod (42) to move the drilling bit (50) into engagement with the vessel wall to cut or drill the opening therein. Rotation of the feed rods (80, 82) in an opposed second direction will raise the drilling rod (42) to retract the drilling bit (50) or move the drilling bit (50) out of contact with the vessel wall.

The feed nut (68) may be comprised of a single piece, element or member defining the first, second and third bores (70, 106, 108) therein or it may be comprised of two or more pieces, elements or members connected, fastened or affixed together to form and act as an integral unit. In either event, the shape or configuration of the feed nut (68) will be dependent upon the desired relative placement or spacing of the bores (70, 106, 108) therein. As indicated, the first bore (70) is preferably centrally located in the feed nut (68). The second and third bores (106, 108) will thus be placed about the circumference of the first bore (70).

More particularly, the feed nut (68) and the bores (70, 106, 108) therein are shaped 10 or configured to be compatible with the housing (26) and the bottom mount (94) connected therewith such that the drilling rod (42) may extend from the upper end (28) of the housing (26) to the first bore (70), the first feed rod (80) may extend from the first sleeve (96) of the bottom mount (94) through the second bore (106) and the second feed rod (82) may extend from the second sleeve (98) of the bottom mount (94) through the third bore (108). In the preferred embodiment, the apparatus (20) is configured such that the drilling rod axis (48), the first feed axis (90) and the second feed axis (92) are substantially parallel to each other.

Further, the first feed rod axis (90) and the second feed rod axis (92) define a diameter of a first circular plane (112) perpendicular to the drilling rod axis (48). Preferably, the drilling rod axis (48) intersects the first circular plane (112) as shown in FIGS. 3 and 6. More preferably, as shown in FIG. 3, the drilling rod axis (48) is positioned between the first and second feed rod axes (90, 92). In other words, a straight line drawn between the first and second feed rod axes (90, 92) intersects the drilling rod axis (42).

In order to operate the feed rod assembly (66), either the first feed rod (80) or the second feed rod (82) may be rotated. Preferably, the first and second feed rods (80, 82) are operated together in a coordinated fashion. Accordingly, in the preferred embodiment, the apparatus (20) further comprises a feed rod linkage (114) for rotatably linking the first feed rod (80) with the second feed rod (82) so that the first feed rod (80) and the second feed rod 982) rotate together. Any structure, device or mechanism capable of linking the feed rods (80, 82) such that they rotate together may be used.

In the preferred embodiment, the feed rod linkage (114) is comprised of a first feed rod sprocket (116) connected with the first feed rod (80) and a second feed rod sprocket (118) connected with the second feed rod (82). The first and second feed rod sprockets (116, 188) may be associated with the first and second feed rods (80, 82) respectively at any position or location along the length of the feed rods (80, 82) so long as the sprocket (116, 118) placement does not interfere with the desired axial movement of the feed nut (68) along the feed rods (80, 82). To minimize any potential interference, the first and second feed rod sprockets (116, 118) are preferably associated with the lower end (86) of each feed rod (80, 82), and most preferably, with the lower end (86) of each feed rod (80, 82) as it passes through and extends from the lowermost surface of the first and second sleeves (96, 98) of the bottom mount (94). The sprocket (116, 118) may be mounted, affixed, fastened or otherwise connected with the lower end (86) either permanently or detachably in any manner permitting the rotation of the feed rod (80, 82).

Figure 5:
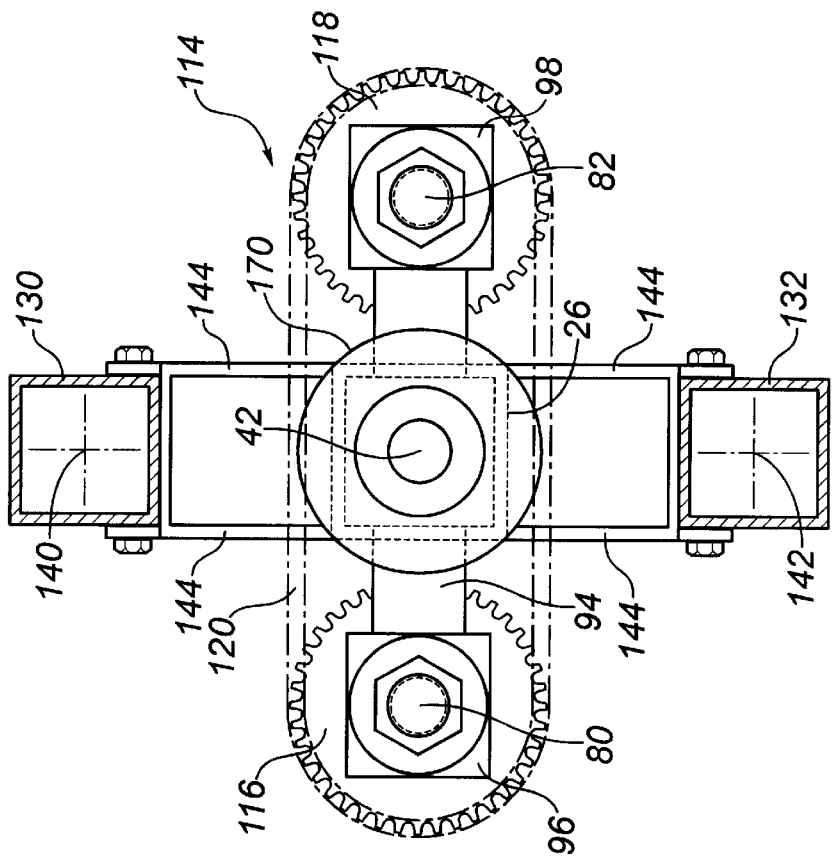
FIG. 5 is a cross-sectional view of the drilling apparatus taken along lines 5—5 of FIG. 1.

Further, the feed rod linkage (114) is comprised of a drive chain (120) as shown in FIGS. 1 and 5. The drive chain (120) is compatible with the sprockets (116, 118) such that the drive chain (120) is engaged with both the first feed rod sprocket (116) and the second feed rod sprocket (118). Accordingly, rotation of one of the feed rods (80, 82) will result in the rotation of the other feed rod (80, 82). Although both of the feed rods (80, 82) may be rotated to actuate the feed rod assembly (66), preferably, either the first feed rod (80) or the second feed rod (82) is rotated. As stated, the feed rod linkage (114) then results in the rotation of the other feed rod (80, 82).

In this regard, the feed rods (80, 82) may be actuated hydraulically, pneumatically,. electrically or mechanically and may be actuated manually or automatically in order to operate the feed rod assembly (66). In any event, the apparatus (20) is preferably comprised of a drive attachment (122) associated with one or both of the first feed rod (80) and the second feed rod (82). FIGS. 1 and 6 show a drive attachment (122) associated with both the first and second feed rods (80, 82) in order to permit greater flexibility with respect to the use of the apparatus (20).

The drive attachment (122) may be associated with each of the first and second feed rods (80, 82) at any position or location along the length of the feed rods (80, 82) so long as the drive attachment (122) placement does not interfere with the desired axial movement of the feed nut (68) along the feed rods (80, 82). To minimize any potential interference, each drive attachment (122) is preferably associated with either the upper end (84) or the lower end (86) of each feed rod (80, 82). However, in the preferred embodiment, for ease of access and operation, the drive attachment (122) is associated with the lower end (86) of each feed rod (80, 82) as it passes through and extends from the lowermost surface of the first and second sleeves (96, 98) of the bottom mount (94) and the sprockets (1116, 118) mounted thereto. Thus, the feed rod assembly (66) has a bottom drive.

Figure 8:
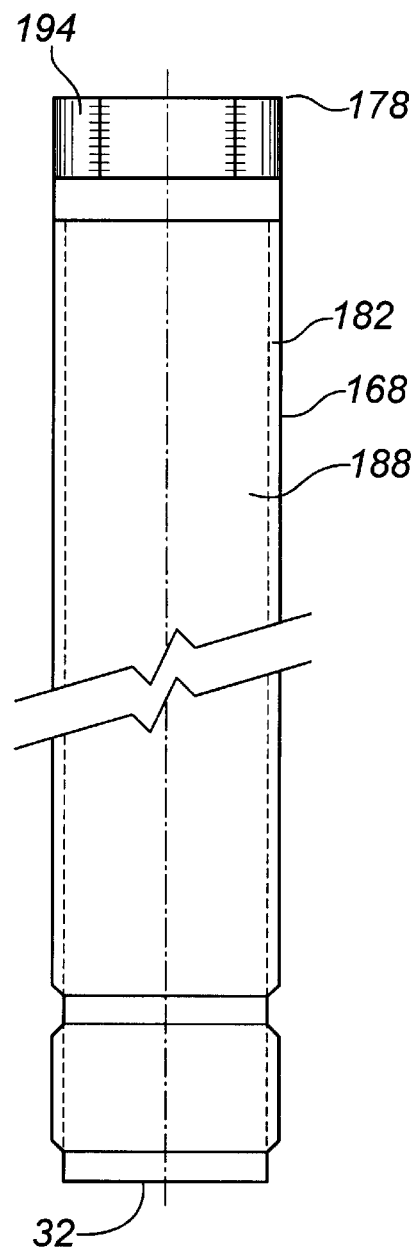
FIG. 8 is a side view of the feed spindle shown in FIG. 7.

The drive attachment (122) may be mounted, affixed, fastened or otherwise connected with the lower end (86) either permanently or detachably in any manner permitting the rotation of the feed rod (80, 82). When rotation of the feed rod (80, 82) is desired, a handle or other manual drive apparatus may be attached with one of the drive attachments (122) to manually rotate the feed rod (80, 82) associated therewith. However, preferably, the drive attachment (122) is adapted for connection with a drive mechanism (124). Accordingly, in operation the drive mechanism (124) is connected with the drive attachment (122) on either the lower end (86) of the first feed rod (80), as shown in FIG. 8, or the lower end (86) of the second feed rod (82).

The drive mechanism (124) may be actuated by any hydraulic, pneumatic, electric or mechanical drive mechanism, apparatus or motor capable of rotating the feed rod (80, 82) through the drive attachment (122) associated therewith. In the preferred embodiment, the drive mechanism (124) is comprised of a motor which may be powered hydraulically, pneumatically or electrically. The drive mechanism or motor (124) may drivingly engage the drive attachment (122) in any operable manner permitting the motor (124) to actuate and rotate the feed rod (80, 82) about its axis (90, 92). Further, it may be desirable to permanently or removably anchor or support the motor (124) during its use. As a result, the motor (124) may be mounted with the housing (26) by a mounting bracket (126) held or fastened into position by welding or by one or more fasteners, such as bolts or screws.

The apparatus (20) is further preferably comprised of a support frame (128), which is also associated with the housing (26) for maintaining alignment of the feed rod assembly (66) as discussed above. Any support structure or form or configuration of support frame (128) may be used which permits the operation of the apparatus (20) while maintaining the alignment of the components of the apparatus (20), including the alignment of the drilling rod axis (48) and the first and second feed rod axes (90, 92).

Preferably, the support frame (128) is comprised of at least one frame member connected with the housing (26). In this case, the frame member has a frame member axis which is preferably substantially parallel to the drilling rod axis (48). However, in the preferred embodiment, the support frame (128) is comprised of two frame members, a first frame member (130) and a second frame member (132) as particularly shown in FIGS. 2, 3 and 4. Both the first frame member (130) and the second frame member (132) are connected with the housing (26). Further, each frame member (130, 132) has an upper end (134), a lower end (136) and an exterior surface (138). As well, the first frame member (130) has a first frame member axis (140) and the second frame member (132) has a second frame member axis (142).

Each frame member (130, 132) is preferably an elongate member or structure and may be comprised of any material capable of providing support to the apparatus (20). Further, the frame members (130, 132) may be solid or rod-like and may have any shape or configuration on cross-section. However, in the preferred embodiment, as shown on FIGS. 4 and 5, the frame members (130, 132) are preferably elongate, tubular members which are square-shaped on cross-section.

Figure 2:
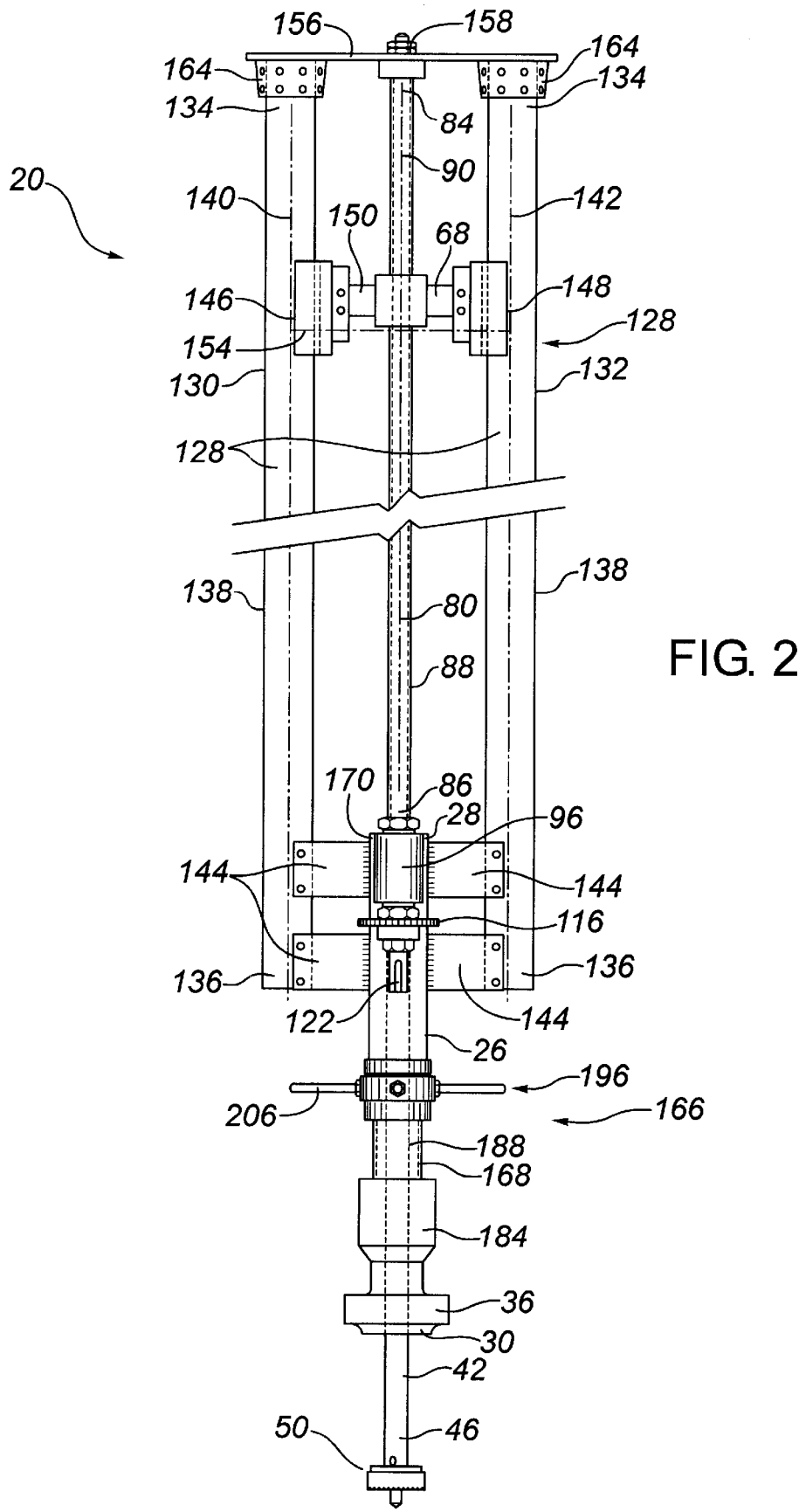
FIG. 2 is a side view of the drilling apparatus as shown in FIG. 1.

The first and second frame members (130, 132) may be connected with the housing (26) at any position or location along the length of the housing (26). Preferably, as shown in FIG. 2, the first and second frame members (130, 132) are rigidly or fixedly connected with the housing (26) at, adjacent or in proximity to the upper end (28) of the housing (26). Further, the first and second frame members (130, 132) may be connected with the housing (26) at any position or location along the length of the frame members (130, 132). Preferably, the first and second frame members (130, 132) are connected with the housing (26) at, adjacent or in proximity to their respective lower ends (136). Thus, in the preferred embodiment, the lower end (136) of each frame members (130, 132) is connected with the upper end (28) of the housing (26) such that each frame members (130, 132) extends from its lower end (136) away from the upper end (28) of the housing (26) to its upper end (134).

The first and second frame members (130, 132) may be connected with the housing (26) in any manner and by any permanent or detachable mounting structure or mechanism permitting the first and second frame members (130, 132) to be relatively rigidly or securely affixed thereto. Further, the first and second frame members (130, 132) may be associated with the bottom mount (94). However, preferably, the first and second frame members (130, 132) are connected, mounted or affixed with the housing (26) by one or more pairs of mounting arms (144) or brackets as shown in FIGS. 2 and 5. In the preferred embodiment, as shown in FIG. 2, two pairs of mounting arms (144) are provided for each frame member (130, 132). More particularly, an innermost end of each arm (144) is welded to, or otherwise rigidly affixed to, the housing (26). An outermost end of each arm (144) is affixed to or connected with the frame member (130, 132) by one or more fasteners, such as screws or bolts. Thus, the arms (144) extending between the housing (26) and the frame members (130, 132) secure the frame members (130, 132) to the housing (26).

Figure 4:
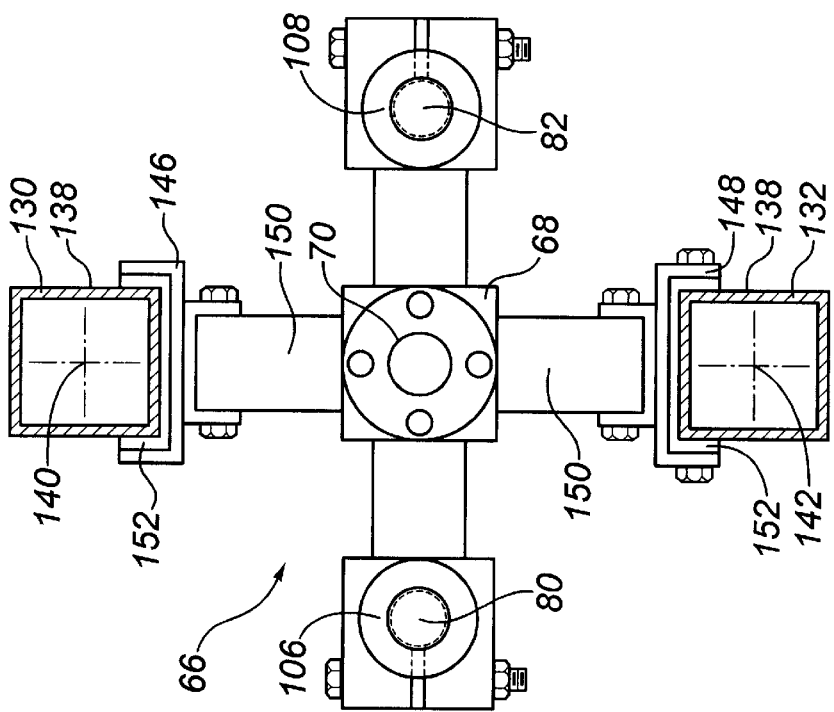
FIG. 4 is a cross-sectional view of the drilling apparatus taken along lines 4—4 of FIG. 1.

In addition, as shown in FIGS. 2–4, the feed nut (68) is preferably further comprised of at least one frame engaging surface such that the frame engaging surface is slidably engaged with at least one frame member to guide and support the feed nut (68) during the axial or longitudinal movement thereof. In the preferred embodiment, the feed nut (68) is comprised of a first frame engaging surface (146) and a second frame engaging surface (148). The first frame engaging surface (146) is slidably engaged with the first frame member (130), while the second frame engaging surface (148) is slidably engaged with the second frame member (132).

Each first and second frame engaging surface (146, 148) may be an integral part, piece or element of the feed nut (68) or it may be connected, affixed, fastened or otherwise mounted with the other parts, pieces or elements comprising the feed nut (68) to provide an integral unit. In the preferred embodiment, the feed nut (68) is comprised of a pair of mounting arms (150) or brackets extending to an outermost end for attachment with the frame engaging surface (146, 148). The outermost end of each arm (150) is affixed to or connected with the frame engaging surface (146, 148) by one or more fasteners, such as screws or bolts.

The first and second frame engaging surfaces (146, 148) may slidably engage the first and second frame members (130, 132) respectively in any manner and by any mechanism or structure which permits the first and second frame engaging surfaces (146, 148) to move or slide along the frame members (130, 132) as the feed nut (68) moves axially, while providing support thereto. In the preferred embodiment, each first and second frame engaging surfaces (146, 148) is shaped or configured to be compatible with the adjacent surface of the frame member (130, 132) to be engaged thereby. Thus, in the preferred embodiment, each first and second frame engaging surface (146, 148) is substantially C-shaped, as shown in FIG. 4, to closely or snugly fit about the adjacent frame member (130, 132).

Further, in order to assist or facilitate the sliding of the frame engaging surface (146, 148) along the frame member (130, 132), each frame engaging surface (146, 148) is preferably comprised of a liner (152) or is coated with a liner material for reducing the friction and wear between the adjacent surfaces. Thus, the liner (152) may be comprised of any relatively wear-resistant, friction reducing material, such as nylon.

Thus, the shape or configuration of the feed nut (68) will also be dependent upon the desired relative placement and spacing of the first and second frame engaging surfaces (146, 148). In the preferred embodiment, the first and second frame engaging surfaces (146, 148) are placed about the circumference of the first bore (70). More particularly, the feed nut (68) and frame engaging surfaces (146, 148) are shaped or configured to be compatible with the housing (26) and the mounting arms (144) associated therewith such that the first frame member (130) may extend from its connection with the housing (26) for engagement with the first frame engaging surface (146) and the second frame member (132) may extend from its connection with the housing (26) for engagement with the second frame engaging surface (148). In the preferred embodiment, the apparatus (20) and feed nut (68) are configured such that the drilling rod axis (48), the first frame member axis (140) and the second frame member axis (142) are substantially parallel to each other.

Further, the first frame member axis (140) and the second frame member axis (142) define a diameter of a second circular plane (154) perpendicular to the drilling rod axis (48). Preferably, the drilling rod axis (48) intersects the second circular plane (154) as shown in 10 FIGS. 2 and 3. More preferably, as shown in FIG. 3, the drilling rod axis (48) is positioned between the first and second frame member axes (140, 142). In other words, a straight line drawn between the first and second frame member axes (140, 142) intersects the drilling rod axis (42).

Referring to FIGS. 1–3 and 6, the apparatus (20) is also preferably comprised of a top mount (156) for the feed rod assembly (66) and for the support frame (128) to enhance the stability and strength of the apparatus (20). The top mount (156) may have any shape or configuration permitting the connection or mounting of the feed rod assembly (66) and the support frame (128) thereto. More particularly, in the preferred embodiment, the upper end (84) of the first feed rod (80) is rotatably connected with the top mount (156) and the upper end (84) of the second feed rod (82) is rotatably connected with the top mount (156). The rotatable connection may be provided in any manner and by any mechanism, device or structure permitting the feed rods (80, 82) to rotate relative to the top mount (156).

However, referring to FIGS. 3 and 6, the top mount (156) preferably defines a first feed rod aperture (158) for rotatably receiving the upper end (84) of the first feed rod (80) therein and a second feed rod aperture (160) for rotatably receiving the upper end (84) of the second feed rod (80) therein. The upper end (84) of each feed rod (80, 82) is mounted or supported within its respective aperture (158, 160) by any mounting assembly, fastener or structure capable of supporting the feed rod (80, 82) axially or longitudinally, while permitting its rotation. In addition, one or more bearings (162) or bearing assemblies are preferably positioned within or associated with each of the first and second feed rod apertures (158, 160) to facilitate the rotation of the feed rod (80, 82) supported therein. In the preferred embodiment, each bearing (162) is comprised of a ball bearing.

Similarly, in the preferred embodiment, the upper end (134) of the first frame member (130) is connected with the top mount (156) and the upper end (134) of the second frame member (132) is connected with the top mount (156). The connection may be provided in any manner and by any mechanism, device or structure permitting the frame members (130, 132) to be firmly or rigidly secured to the top mount (156). For instance, the upper end (134) may be welded to the top mount (156). However, referring to FIGS. 1 and 2, in the preferred embodiment, the upper end (134) of each frame member (130, 132) is secured or mounted with a lowermost surface of the top mount (156) by at least one mounting bracket (164) associated therewith. Specifically, the mounting bracket (164) is preferably welded to the lowermost surface of the top mount (156) and the upper end (134) of each frame member (130, 132) is held or secured to the mounting bracket (164) by one or more fasteners, such as bolts or screws.

The feed nut (68) will preferably be provided with a range of axial movement between the upper end (28) of the housing (26) and the top mount (156). Thus, the threaded exterior surface (88) of each feed rod (80, 82) preferably extends between the upper end (28) of the housing (26) and the top mount (156). Accordingly, the length of each feed rod (80, 82) and the length of each frame member (130, 132) will be selected depending upon the desired range of axial movement of the feed nut (68), which will vary depending upon the vessel to be tapped and its location beneath the ground. Similarly, the length of the drilling rod (42) will be selected and will be dependent upon the vessel to be tapped and its location beneath the ground, as well as the desired range of axial movement of the feed nut (68). In the preferred embodiment, the drilling rod (42) has a length of about 171 inches (about 434 cm) and the apparatus (20) provides for a range of axial movement of the feed nut (68) of up to about 120 inches (305 cm).

If desired, the range of axial movement may be limited or further axial movement of the feed nut (68) may be prevented by the placement of at least one stop member (not shown) associated with at least one feed rod (80, 82). More particularly, the stop member may be associated with, or mounted or positioned about, the feed rod (80, 82) in a manner such that further axial movement of the feed nut (68) along the feed rod (68) in the direction of, and past, the stop member is not permitted. For instance, in the event that downward movement of the feed nut (68) is desired to be limited, the stop member would be associated with at least feed rod (80, 82) at a position along the feed rod (80, 82) between the feed nut (68) and the bottom mount (94). Thus, a range of axial movement of the feed nut (68) will be provided between the stop member and the top mount (156).

The feed rod assembly (66) described above permits a relatively "rapid feed" of the drilling rod (42) through the housing bore (32) to move the drilling bit (50) rapidly towards and away from the vessel wall. However, it may be preferable to also permit a relatively "slow feed" of the drilling rod (42). This may be accomplished by manually operating the feed rod assembly (66) as discussed above. However, in the preferred embodiment, the apparatus (20) is further comprised of an alternate housing feed assembly as described below. As a result, the movement of the drilling rod (42) may be varied and more closely controlled by the operator of the apparatus (20). For instance, the rapid feed may be used to bring the drilling bit (50) into contact with the vessel wall and to retract the drilling bit (50) following completion of the tapping operation. The slow feed may be used during the actual drilling of the vessel wall.

Referring to FIG. 6, the slow feed is provided by a housing feed assembly (166). More particularly, the housing (26) is comprised of an inner housing member (168) and an outer housing member (170) which are permitted to telescope or move axially or longitudinally relative to each other. Preferably, the outer housing member (170) has an upper end (172) defining the upper end (28) of the housing (26), a lower end (174) and an interior surface (176). The inner housing member (168) has an upper end (178), a lower end (180) defining the lower end (30) of the housing (26) and an exterior surface (182). The upper end (178) of the inner housing member (168) extends through the lower end (174) of the outer housing member (170) such that upper end (178) is received and contained within the outer housing member (170). Further, the exterior surface (182) of the inner housing member (168) engages the interior surface (176) of the outer housing member (170) in a manner permitting the housing members (168, 170) to telescope relative to each other and move axially or longitudinally to increase or decrease the length of the housing (26) between its upper and lower ends (28, 30).

More particularly, the inner housing member (168) is comprised of a lower feedscrew (184) which comprises the lower end (180) of the inner housing member (168) and which as adapted for connection with the valve device (22) as discussed above. Preferably, the sealing device (56) described above is located within the feed screw (184) between the drilling rod (42) and the portion of the housing bore (32) defined by the feed screw (184). Further, to facilitate the removal of the feed screw (184) from the valve device (22) following completion of the tapping operation, a bleed valve (186) preferably extends through the feed screw (184) to permit any pressure within the feed screw (184) to be bled off prior to removal. Preferably, the bleed valve (186) extends through the feed screw (184) at a location between the sealing device (56) and the lower end (30) of the housing (26).

The inner housing member (168) is further comprised of an upper feed spindle (188) which extends from the lower feed screw (184) into the outer housing member (170). The feed spindle (188) may be integrally formed with the feed screw (184) or it may be connected with the feed screw (184) in any manner and by any mechanism, device or fastener capable of connecting, mounting or otherwise permanently or removably affixing the feed spindle (188) with the feed screw (184) such that the feed spindle (188) is inhibited or prevented from rotating relative to the feed screw (184). In other words, the feed spindle (188) and the feed screw (184) act as an integral unit. In the preferred embodiment, a threaded connection (190) is provided between the feed spindle (188) and the feed screw (184). Further, in order to prevent relative rotation between the feed spindle (188) and the feed screw (184), a lockscrew (192) or other stop device preferably extends between the feed spindle (188) and the feed screw (184).

As a result of the connection of the feed screw (184) to the valve device (22) and the connection between the feed screw (184) and the feed spindle (188), the entire inner housing member (168) is maintained in a relatively stationary position and is inhibited from moving, either axially or rotationally, during the tapping operation.

Figure 7:
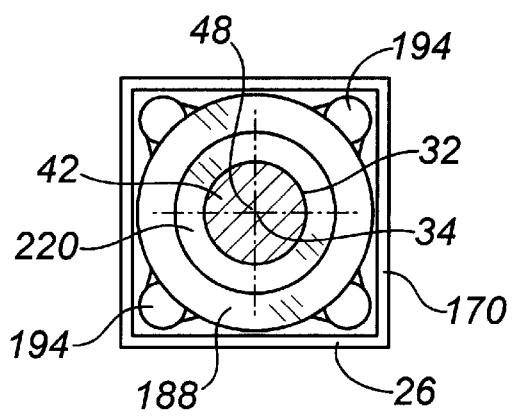
FIG. 7 is a cross-sectional view of the drilling apparatus taken along lines 7—7 of FIG. 6, showing a feed spindle therein.

The exterior surface (182) of the feed spindle (188) is adapted to be received within the interior surface (176) of the outer housing member (170) in sliding engagement to permit the telescoping therebetween. Further, the exterior surface (182) of the feed spindle (188) and the interior surface (176) of the outer housing member (170) are adapted or configured to inhibit any relative rotation therebetween. In the preferred embodiment, as shown in FIGS. 6–8, the outer housing member (170) is square in cross-section. Further, the upper end (178) of the feed spindle (188) is comprised of one or more anti-rotation members (194) or pieces shaped or configured for receipt in and abutment with the corners of the outer housing member (170). Preferably, four anti-rotation members (194) are provided for receipt in each of the four corners. Rotation of the feed spindle (188) relative to the outer housing member (17) is inhibited or prevented by the abutment of the anti-rotation member (194) within its respective corner of the outer housing member (170). These anti-rotation members (194) further guide or direct the axial or longitudinal movement of the outer housing member (170) relative to the feed spindle (188), while inhibiting any relative rotation therebetween.

As discussed previously, both the first and second feed rods (80, 82) and the first and second frame members (130, 132) are connected with the housing (26), preferably its upper end (28). Thus, in the preferred embodiment, the first and second feed rods (80, 82) and the first and second frame members (130, 132) are connected with the upper end (172) of the outer housing member (170). As a result of the telescoping arrangement between the inner and outer housing members (168, 170) and the connection between the outer housing member (170) and the first and second feed rods (80, 82) and the first and second frame members (130, 132), telescoping of the outer housing member (170) away or apart from the inner housing member (168) will raise the entire feed rod assembly (66) and support frame (128) resulting in the movement of the drilling rod (42) within the housing bore (32) in a direction to retract the drilling bit (50) from the vessel. Conversely, telescoping of the outer housing member (170) towards or within the inner housing member (168) will lower the entire feed rod assembly (66) and support frame (128) resulting in the movement of the drilling rod (42) within the housing bore (32) in a direction to engage the drilling bit (50) with the vessel. Thus, the alternative slow feed is provided by controlling the telescoping of the inner and outer housing members (168, 170).

Any mechanism or structure may be provided for telescoping the inner and outer housing members (168, 170). However, in the preferred embodiment, the housing (26) includes a feed unit (196). More particularly, the feed unit (196) is comprised of a feed sleeve (198) having an upper end (200), a lower end (202) and a bore (204) extending therethrough. The feed sleeve (198) is positioned about the feed spindle (188) in engagement therewith. More particularly, the bore (204) of the feed sleeve (198) includes a threaded interior surface compatible with a threaded exterior surface (182) of the feed spindle (188). Thus rotation of the feed sleeve (198) relative to the feed spindle (188) causes the feed sleeve (198) to move axially along the feed spindle (188). A handle (206) is preferably connected with the lower end (202) of the feed sleeve (198) such that manipulation of the handle (206), preferably manually, causes the feed sleeve (198) to rotate relative to the feed spindle (188).

The feed unit (196) is further comprised of a tubular mounting member (208) having an upper end (210), a lower end (212) and a bore (214) extending therethrough. The mounting member (208) is supported by and rotatably mounted about the feed sleeve (198) such that the feed sleeve (198) is permitted to rotate within the bore (214) of the mounting member (208). Further, the lower end (174) of the outer housing member (170) is connected or mounted with the mounting member (208), preferably at its upper end (210), in a manner preventing the rotation of the outer housing member (170) relative to the mounting member (208), such as by welding.

As a result, rotation of the handle (206) rotates the feed sleeve (198) relative to the stationary feed spindle (188) to move the feed sleeve (198) axially along the feed spindle (188). The feed spindle (188) is permitted to rotate within the mounting member (208). The mounting member (208) and the outer housing member (170) are inhibited from rotating relative to the feed spindle (188) by the operation of the anti-rotation members (194). As a result, as the feed sleeve (198) moves axially along the feed spindle (188), the outer housing member (170) is moved axially or longitudinally relative to the inner housing member (168) to provide the desired slow feed.

Referring to FIG. 6, one or more bearings are preferably contained within the feed unit (196) to rotatably support the mounting member (208) about the feed sleeve (198) and thus, facilitate the rotation of the feed sleeve (198) within the mounting member (208) supported thereby. Although any type of bearing capable of and suitable for performing this function may be used, the bearing or bearings preferably act or perform as a combination radial and thrust bearing. In the preferred embodiment, at least one upper bearing (216) or bearing assembly, preferably a ball bearing, is located between the mounting member (208) and the upper end (200) of the feed sleeve (198) which acts or performs as both a radial and a thrust bearing. In addition, a further lower bearing (218) or bearing assembly, such as a ball bearing, is preferably located between an outer surface of the feed sleeve (198) and an inner surface of the mounting member (208).

Finally, one or more bearings or bearing assemblies are preferably associated with the drilling rod (42) to facilitate the rotation thereof within the housing (26). Thus, one or more bearings or bearing assemblies are preferably located or positioned between adjacent surfaces of the drilling rod (42) and the housing bore (32). As indicated, the bearings permit or facilitate the rotation of the drilling rod (42), as well as the centralization of the drilling rod (42) within the housing bore (32) as it extends therethrough. Thus, the bearings act or perform largely as radial bearings, although any type of bearing capable of and suitable for performing this function may be used. In the preferred embodiment, at least one upper bearing (220) is located or positioned between the bore (32) of the inner housing member (168), and particularly the feed spindle (188), at, adjacent or in proximity to the upper end (178). At least one lower bearing (222) is located or positioned between the bore (32) of the inner housing member (168), and particularly the feed spindle (188), at, adjacent or in proximity to a lowermost end of the feed spindle (188) in abutment with the feed screw (184). Both the upper and lower bearings (220, 222) are preferably comprised of a sleeve or bushing comprised of a suitable material, such as an aluminum-bronze bushing.

In operation, prior to the installation of the apparatus (20), the dimensions of the vessel to be tapped are determined, particularly the depth of the vessel and the overall length or height between the vessel wall and the upper end (24) of the valve device (22). If necessary, one or more stop members may be set in position along one or both of the feed rods (80, 82) such that the range of axial movement of the feed nut (68) is compatible with the intended tapping operation. The valve device (22) is then accessed and opened to permit entry of the drilling rod (42) therethrough. The drilling bit (50) is then selected depending upon the desired opening to be drilled through the vessel wall and connected with the drilling rod (42).

Once the apparatus (20) and the valve device (22) are prepared, the flange (36) at the lower end (30) of the housing (26) of the apparatus (20) is mounted with the upper end (24) of the valve device (22) by fastening the bolts or screws extending therebetween. The feed rod assembly (66) or rapid feed is then actuated or operated in order to advance the drilling rod (42) axially downwards through the housing bore (32) such that the attached drilling bit (50) engages the vessel wall. Preferably, the drilling bit (50) engages the vessel wall at the end of the downward range of axial movement of the feed nut (68), in which the feed nut (68) is engaged by or is abutted against the stop member. Any further advancement of the drilling rod (42) and the drilling bit (50) is preferably performed by using the housing feed assembly (166) or slow feed. However, alternately, the stop member may be positioned to permit the use of the feed rod assembly (66) or rapid feed for the complete tapping operation.

The drilling rod (42) is then rotated in order to commence the drilling of the vessel wall by the drilling bit (50) or the tapping of the vessel. As indicated, either the feed rod assembly (66) or the housing feed assembly (166) may be used to advance the drilling bit (50) as the drilling bit (50) bores through the vessel wall. Once the opening has been cut or drilled through the vessel wall, the drilling bit (50) and the drilling rod (42) are retracted from the vessel. Again, either the feed rod assembly (66) or the housing feed assembly (166) may be used to retract or withdraw the drilling bit (50). However, preferably, the housing feed assembly (166) is used to retract the drill bit (50) from within the vessel. Once the drilling bit (50) clears the vessel wall, the feed rod assembly (66) is preferably used to further move the drilling rod (42) axially upwards through the housing bore (32) to withdraw the drilling bit (50) from the valve device (22).

Once the valve device (22) is cleared, the valve device (22) is closed to prevent the passage of any fluids out of the vessel through the valve device (22). The bleed valve (186) is then opened to bleed off any pressure within the housing (26) of the apparatus (20) adjacent the valve device (22). Once any pressure is released, the flange (36) at the lower end (30) of the housing (26) of the apparatus (20) may be removed from the upper end (24) of the valve device (22) by removing the bolts or screws extending therebetween.

The embodiments of the invention in which an exclusive privilege or property is claimed are defined as follows:

1. A drilling apparatus for tapping into a fluid containing vessel from a valve device connected with the vessel, the apparatus comprising:

(a) a housing having a lower end adapted for attachment of the apparatus to the valve device, the housing defining a housing bore, the housing bore defining a housing bore axis;

(b) a feed rod assembly connected with the housing adjacent to the housing bore, and not contained within the housing bore, wherein the feed rod assembly is comprised of a first feed rod connected with the housing adjacent to the housing bore and a second feed rod connected with the housing adjacent to the housing bore;

(c) a feed nut connected with the feed rod assembly, the feed nut defining a first bore;

(d) a drilling rod extending through the housing bore and rotatably supported in the first bore of the feed nut; and (e) a drilling bit connected to a lower end of the drilling rod, for tapping into the vessel;

wherein manipulation of the feed rod assembly results in axial movement of the feed nut and the drilling rod relative to the housing bore axis so that the drilling rod moves through the housing bore.

2. The apparatus as claimed in claim 1 wherein the first feed rod is rotatably connected with the housing, wherein the second feed rod is rotatably connected with the housing and wherein rotation of the first feed rod and the second feed rod result in axial movement of the feed nut and the drilling rod relative to the housing bore axis so that the drilling rod moves through the housing bore.

3. The apparatus as claimed in claim 2 wherein the first feed rod is comprised of a threaded exterior surface, wherein the feed nut defines a second bore, and wherein the second bore is comprised of a threaded interior surface which engages the threaded exterior surface of the first feed rod.

4. The apparatus as claimed in claim 3 wherein the second feed rod is comprised of a threaded exterior surface, wherein the feed nut defines a third bore, and wherein the third bore is comprised of a threaded interior surface which engages the threaded exterior surface of the second feed rod.

5. The apparatus as claimed in claim 2, further comprising a feed rod linkage for rotatably linking the first feed rod with the second feed rod so that the first feed rod and the second feed rod rotate together.

6. The apparatus as claimed in claim 5 wherein the feed rod linkage is comprised of a first feed rod sprocket connected with the first feed rod, a second feed rod sprocket connected with the second feed rod, and a drive chain engaged with both the first feed rod sprocket and the second feed rod sprocket.

7. The apparatus as claimed in claim 5 wherein the drilling rod has a drilling rod axis, wherein the first feed rod has a first feed rod axis, wherein the second feed rod has a second feed rod axis, and wherein the drilling rod axis, the first feed rod axis and the second feed rod axis are substantially parallel to each other.

8. The apparatus as claimed in claim 7 wherein the first feed rod axis and the second feed rod axis define a diameter of a first circular plane perpendicular to the drilling rod axis and wherein the drilling rod axis intersects the first circular plane.

9. The apparatus as claimed in claim 8, further comprising a support frame associated with the housing for maintaining alignment of the feed rod assembly.

10. The apparatus as claimed in claim 9 wherein the support frame is comprised of a first frame member connected with the housing and a second frame member connected with the housing.

11. The apparatus as claimed in claim 10 wherein the first frame member has a first frame member axis, wherein the second frame member has a second frame member axis, and wherein the drilling rod axis, the first frame member axis and the second frame member axis are substantially parallel to each other.

12. The apparatus as claimed in claim 11 wherein the first frame member axis and the second frame member axis define a diameter of a second circular plane perpendicular to the drilling rod axis and wherein the drilling rod axis intersects the second circular plane.

13. The apparatus as claimed in claim 12, further comprising a sealing device contained within the housing bore for sealing between the housing bore and the drilling rod.

14. The apparatus as claimed in claim 13, further comprising a drive attachment associated with one of the first feed rod and the second feed rod, for connection with a drive mechanism in order to rotate the first feed rod and the second feed rod.

15. The apparatus as claimed in claim 14 wherein the first feed rod has a lower end, wherein the second feed rod has a lower end, and wherein the drive attachment is associated with either the lower end of the first feed rod or the lower end of the second feed rod.

16. The apparatus as claimed in claim 15, further comprising a top mount for the feed rod assembly and for the support frame.

17. The apparatus as claimed in claim 16 wherein the first feed rod has an upper end rotatably connected with the top mount and wherein the second feed rod has an upper end rotatably connected with the top mount.

18. The apparatus as claimed in claim 17 wherein the first frame member has an upper end connected with the top mount and wherein the second frame member has an upper end connected with the top mount.

19. The apparatus as claimed in claim 18 wherein the feed nut is comprised of a first frame engaging surface and a second frame engaging surface, wherein the first frame engaging surface is slidably engaged with the first frame member, and wherein the second frame engaging surface is slidably engaged with the second frame member.

20. The apparatus as claimed in claim 19 wherein the feed nut has a range of axial movement between an upper end of the housing and the top mount.

21. A drilling apparatus for tapping into a fluid containing vessel from a valve device connected with the vessel, the apparatus comprising:

(a) a housing having a lower end adapted for attachment of the apparatus to the valve device, the housing defining a housing bore, the housing bore defining a housing bore axis;

(b) a feed rod assembly connected with the housing adjacent to the housing bore, and not contained within the housing bore;

(c) a feed nut connected with the feed rod assembly, the feed nut defining a first bore;

(d) a drilling rod extending through the housing bore and rotatably supported in the first bore of the feed nut;

(e) a drilling bit connected to a lower end of the drilling rod, for tapping into the vessel; and (f) a support frame associated with the housing for maintaining alignment of the feed rod assembly, wherein the support frame is comprised of a first frame member connected with the housing and a second frame member connected with the housing;

wherein manipulation of the feed rod assembly results in axial movement of the feed nut and the drilling rod relative to the housing bore axis so that the drilling rod moves through the housing bore.

22. The apparatus as claimed in claim 21 wherein the drilling rod has a drilling rod axis, wherein the first frame member has a first frame member axis, wherein the second frame member has a second frame member axis, and wherein the drilling rod axis, the first frame member axis and the second frame member axis are substantially parallel to each other.

23. The apparatus as claimed in claim 22 wherein the first frame member axis and the second frame member axis define a diameter of a second circular plane perpendicular to the drilling rod axis and wherein the drilling rod axis intersects the second circular plane.

24. The apparatus as claimed in claim 23 wherein the feed nut is comprised of a first frame engaging surface and a second frame engaging surface, wherein the first frame engaging surface is slidably engaged with the first frame member, and wherein the second frame engaging surface is slidably engaged with the second frame member.

25. The apparatus as claimed in claim 24 wherein the feed rod assembly is comprised of a first feed rod connected with the housing adjacent to the housing bore and a second feed rod connected with the housing adjacent to the housing bore.

26. The apparatus as claimed in claim 25 wherein the first feed rod is rotatably connected with the housing, wherein the second feed rod is rotatably connected with the housing and wherein rotation of the first feed rod and the second feed rod result in axial movement of the feed nut and the drilling rod relative to the housing bore axis so that the drilling rod moves through the housing bore.

27. The apparatus as claimed in claim 26 wherein the first feed rod has a first feed rod axis, wherein the second feed rod has a second feed rod axis, and wherein the drilling rod axis, the first feed rod axis and the second feed rod axis are substantially parallel to each other.

28. The apparatus as claimed in claim 27 wherein the first feed rod axis and the second feed rod axis define a diameter of a first circular plane perpendicular to the drilling rod axis and wherein the drilling rod axis intersects the first circular plane.

29. The apparatus as claimed in claim 28, further comprising a drive attachment associated with one of the first feed rod and the second feed rod, for connection with a drive mechanism in order to rotate the first feed rod and the second feed rod.

30. The apparatus as claimed in claim 29 wherein the first feed rod has a lower end, wherein the second feed rod has a lower end, and wherein the drive attachment is associated with either the lower end of the first feed rod or the lower end of the second feed rod.

31. The apparatus as claimed in claim 28, further comprising a top mount for the feed rod assembly and for the support frame.

32. The apparatus as claimed in claim 31 wherein the first frame member has an upper end connected with the top mount and wherein the second frame member has an upper end connected with the top mount.

33. The apparatus as claimed in claim 32 wherein the first feed rod has an upper end rotatably connected with the top mount and wherein the second feed rod has an upper end rotatably connected with the top mount.

34. The apparatus as claimed in claim 31 wherein the feed nut has a range of axial movement between an upper end of the housing and the top mount.

* * * * *